(12) United States Patent
Cosandier et al.

(10) Patent No.: US 11,680,602 B2
(45) Date of Patent: Jun. 20, 2023

(54) DEVICE COMPRISING INTERLOCKED MONOLITHIC FLEXIBLE ELEMENTS AND CORRESPONDING ADDITIVE MANUFACTURING METHOD

(71) Applicant: CSEM Centre Suisse d'Electronique et de Microtechnique SA—Recherche et Développement, Neuchâtel (CH)

(72) Inventors: Florent Cosandier, Colombier (CH); Lionel Kiener, Pomy (CH); Johan Kruis, Epalinges (CH); Hervé Saudan, Corminboeuf (CH)

(73) Assignee: CSEM CENTRE SUISSE D'ELECTRONIQUE ET DE MICROTECHNIQUE SA—RECHERCHE ET DÉVELOPPEMENT, Neuchâtel (CH)

( * ) Notice: Subject to any disclaimer, the term of this patent is extended or adjusted under 35 U.S.C. 154(b) by 530 days.

(21) Appl. No.: 16/775,340

(22) Filed: Jan. 29, 2020

(65) Prior Publication Data
US 2020/0240462 A1 Jul. 30, 2020
US 2023/0148453 A9 May 11, 2023

(30) Foreign Application Priority Data

Jan. 31, 2019 (EP) ..................................... 19154821

(51) Int. Cl.
*F16C 11/12* (2006.01)
*G06F 113/10* (2020.01)
*F16D 3/74* (2006.01)

(52) U.S. Cl.
CPC .......... *F16C 11/12* (2013.01); *F16C 2220/24* (2013.01); *F16C 2300/02* (2013.01); *F16D 3/74* (2013.01); *G06F 2113/10* (2020.01)

(58) Field of Classification Search
CPC ..... B29C 64/393; B29C 64/245; B29C 64/10; F16C 11/12; F16C 2220/24;
(Continued)

(56) References Cited

U.S. PATENT DOCUMENTS 9,207,641 B2 12/2015 Henein et al.

FOREIGN PATENT DOCUMENTS

WO WO-2015169934 A1 * 11/2015 ............. F16C 11/12

OTHER PUBLICATIONS

W. H. Wittrick, "The Theory of Symmetrical Crossed Flexure Pivots," Department of Aeronautical Engineering, University of Sydney, Australia, 1948.
(Continued)

*Primary Examiner* — Vishal V Vasisth
(74) *Attorney, Agent, or Firm* — Nixon & Vanderhye (57) ABSTRACT

Disclosed is a device including a compliant mechanism including: a first monolithic flexible element, having first and second ends defining a first longitudinal direction, arranged such that it is able to be subjected to an elastic deformation involving a relative movement between its first and second ends; and at least a second monolithic flexible element, having first and second ends defining a second longitudinal direction distinct from the first longitudinal direction, arranged such that it is able to be subjected to an elastic deformation involving a relative movement between its first and second ends. At least one of the first and second monolithic flexible elements includes at least one opening located between its first and second ends and defining a passage for a portion of the other monolithic flexible element such that the first and second monolithic flexible elements are interlocked.

20 Claims, 9 Drawing Sheets

(58) Field of Classification Search
CPC .............. F16C 2300/02; F16C 2370/00; G06F 2113/10; G06F 30/20; B33Y 10/00; B33Y 50/02; B33Y 80/00; B33Y 30/00
See application file for complete search history.

(56) References Cited

OTHER PUBLICATIONS

C-Flex Bearing Co., Inc., C-Flex bearing, 2015, <https://c-flex.com/>.

Merriam, "Stiffness Reduction Strategies for Additively Manufactured Compliant Mechanisms", All Theses and Dissertations, 2016, vol. 5873 <https://scholarsarchive.byu.edu/etd/5873>.

\* cited by examiner

DEVICE COMPRISING INTERLOCKED MONOLITHIC FLEXIBLE ELEMENTS AND CORRESPONDING ADDITIVE MANUFACTURING METHOD

TECHNICAL FIELD

The invention concerns a device comprising a compliant mechanism comprising
  a first monolithic flexible element, having first and second ends defining a first longitudinal direction, arranged such that it is able to be subjected to an elastic deformation involving a relative movement between its first and second ends, and
    at least a second monolithic flexible element, having first and second ends defining a second longitudinal direction distinct from the first longitudinal direction, arranged such that it is able to be subjected to an elastic deformation involving a relative movement between its first and second ends.

A compliant mechanism is a flexible device, capable of transferring force or displacement through the elastic deformation of its mechanical structure. Very often, the flexible elements of compliant mechanisms are designed with a blade geometry, which can be generally defined as a parallelepiped with a length usually much bigger than its width and its width usually much bigger than its thickness. This definition is not limitative. Flexure blades can also be conceived with variable thickness, with notch or conical profile or any other type of profiles.

According to a preferred embodiment, the first and second flexible elements can be connected to at least first and second masses so as to define a pivot mechanical link.

The invention further concerns a method for manufacturing such a device.

STATE OF THE ART

Devices comprising at least first and second flexible elements arranged so as to define a pivot mechanical link are already known in the state of the art.

Figure 1A:
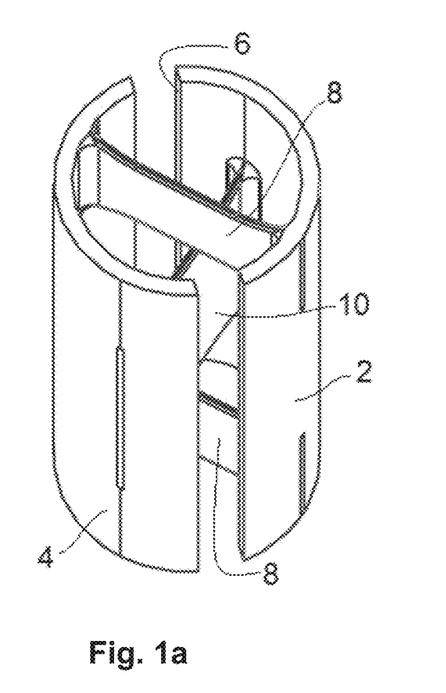
FIGS. 1a, 1b and 1c: schematic illustrations relating to a prior art device.
Figure 1B:
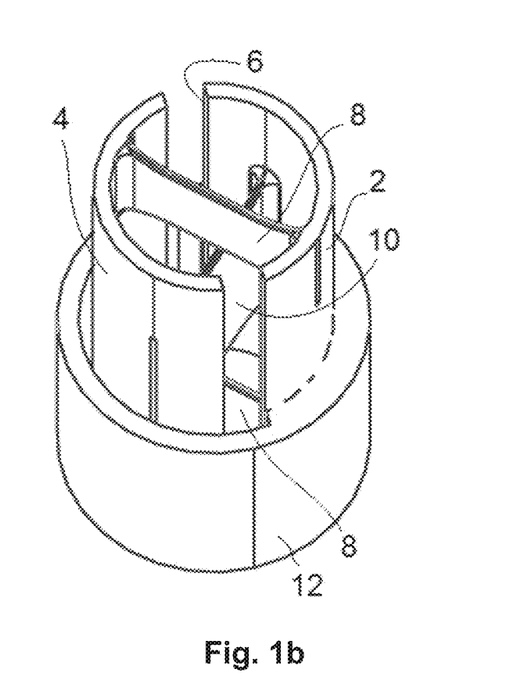
Figure 1C:
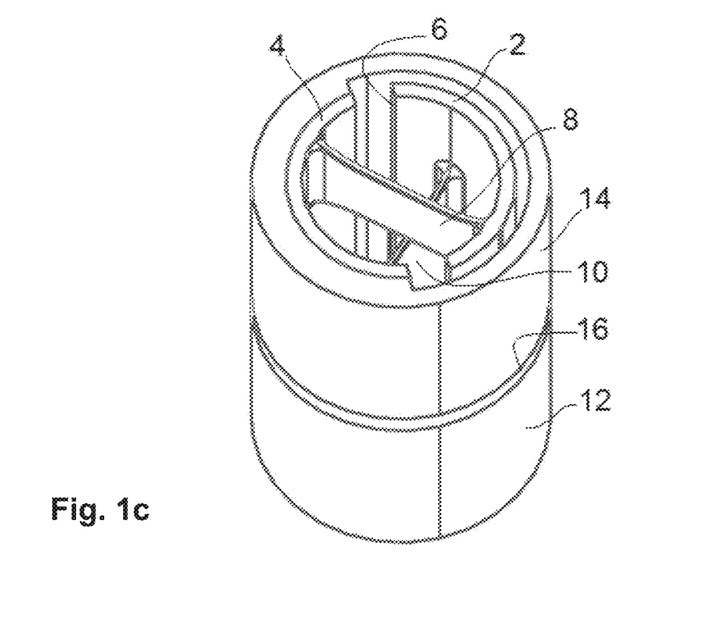

For instance, FIGS. 1a, 1b and 1c illustrate how a pivot bearing comprising such flexible elements is built, this bearing being available from C-FLEX BEARING CO., INC. (https://c-flex.com/).

As illustrated in FIG. 1a, this C-Flex bearing comprises two hemi-cylindrical parts 2 and 4 defining a first gap 6 between them and connected to each other by means of three flexible elements 8 and 10. Each of the flexible elements has a first end connected to a first hemi-cylindrical part 2 and its second end connected to the other hemi-cylindrical part 4. Two flexible elements 8 are arranged so as to be located within a same first plane, while the third flexible element 10 is located in a second plane arranged so as to intersect the first plane. It is noticeable that the third flexible element 10 has a bigger width than the first and second flexible elements such that the assembly substantially presents a vertical symmetry in its behaviour, with respect to a virtual pivot axis located at the intersection of the first and second planes.

Each of the flexible elements has a blade shape and is connected to the hemi-cylindrical parts by force fitting and/or soldering or gluing. In alternative, this device can be obtained by complex machining, e.g. milling or wire electro-discharge machining together with the two hemi-cylindrical parts 2 and 4.

FIG. 1b illustrates how a bottom mass 12 is brought together with a first hemi-cylindrical part 2 while FIG. 1c illustrates how an upper mass 14 is brought together with the other hemi-cylindrical part 4 for completing the assembly and defining a second gap 16 between the bottom mass 12 and the upper mass 14 so that they are free to rotate with respect to each other. Here again the masses 12 and 14 can be soldered or glued to the corresponding hemi-cylindrical part.

This bearing is thus complex to manufacture, regarding its number of independent components and the way they have to be assembled together, and can be bulky in some cases because of the contiguous arrangement of the blades.

Further, it requires dedicated hemi-cylinders for each pivot size and each stiffness (there are different stiffness for the same size of a pivot, with different blade thickness), in parallel with expensive production apparatuses, e.g. soldering or gluing jigs. Therefore, changing a characteristic such as the size of the blades, e.g. the thickness to vary the rotational stiffness, implies to modify or make new production apparatuses.

Further, that kind of construction is far from perfection regarding its symmetry because of the arrangement of its blades which is not symmetrical. This lack of symmetry might lead to a known adverse phenomenon called axial centre shift. This phenomenon lies in the fact that the pivot axis might be offset with respect to the intersection of the first and second planes containing the blades, during a deformation of the compliant mechanism.

U.S. Pat. No. 9,207,641 B2 discloses a similar pivot bearing used as a part of a timepiece oscillator and thus limited in its dimensions and in the moments of forces it can handle. More particularly, this document discloses an embodiment of the timepiece oscillator comprising three blades arranged in a way which is similar to that of the C-Flex pivot bearing, i.e. one wider blade arranged between two thinner blades. A manufacturing method for this oscillator is mentioned which would consist in machining a silicon part. Though such a method might be easier to implement than for the C-Flex bearing assembly, it requires expensive production apparatuses and operating conditions. Furthermore, this manufacturing approach implies a limitation of the size of the devices which can be manufactured and therefore a strong limitation in the load capability of such pivot. Finally, the centre shift phenomenon is still present with this silicon structure.

Thus, the need still exists for a manufacturing method of a device comprising flexible elements as mentioned above, which would be suitable for mass production without the necessity to have production apparatuses dedicated to the manufacture of this specific device.

Of course, additive manufacturing comes to mind when mass production is sought after. Many techniques for manufacturing devices through additive manufacturing (AM) processes are already known in the state of the art. In particular, the manufacture of compliant mechanisms through additive manufacturing processes like Selective Laser Melting (SLM), Selective Laser Sintering (SLS), Fused Deposition Melting (FDM), Electron Beam Melting (EBM), Direct Energy Deposition (DED), Binder Jetting (BJ) and Photopolymerization (e.g. Stereolithography (SLA), or Digital Light Processing (DLP)) is well documented.

More specifically, in 2016, Ezekiel G. Merriam submitted a dissertation at the Department of Mechanical Engineering of the Brigham Young University entitled "Stiffness Reduction Strategies for Additively Manufactured Compliant Mechanisms" and which can be found here: https://scholarsarchive.byu.edu/cgi/viewcontent.cgi?referer=https://www-.google.com/&httpsredir=1&article=6872&context=etd The work that led to this dissertation included an extensive study of additive manufacturing methods which had been described previously for manufacturing compliant mechanisms.

An example of a cross-axis flexural pivot is illustrated in FIG. 3.2, on page 24, of this dissertation, or in FIG. 6.3, on page 70. This pivot comprises two plates connected to each other by two contiguous flexible blades each of which is contained in a plane intersecting the plane of the other blade.

Though this document provides many examples of compliant mechanisms with improved mechanical properties, which can be easily manufactured by additive manufacturing, it does not provide any convincing solution regarding the centre shift phenomenon, but merely experimental results concerning assessments of the phenomenon (see in Chapter 6). Indeed, apart from device constructions which are very similar to those mentioned above, this document merely discloses improvements in the design of the flexible blades, or very complex constructions based on a static balance approach.

Hence, a need still exists for simple additive manufacturing methods allowing the manufacture of devices comprising monolithic compliant mechanisms in a large range of overall dimensions and presenting improved mechanical properties with respect to known constructions.

DISCLOSURE OF THE INVENTION

An aim of the invention is to propose a method for manufacturing a device comprising a compliant mechanism which overcomes the above-mentioned disadvantages of the prior art and which is suitable for a wide range of shapes and applications, also in the field of large scale manufacturing or smart factory production.

More specifically, the invention relates to a device comprising a compliant mechanism of the kind mentioned above, wherein at least one of the first and second monolithic flexible elements comprises at least one opening located between its first and second ends and defining a passage for a portion of the other of the first and second monolithic flexible elements such that the first and second monolithic flexible elements are interlocked.

By "interlocked" in the context of the present invention, it is meant that at least a portion of one monolithic flexible element is located through an opening arranged in another monolithic flexible element in any relative position the two concerned flexible elements might take when the corresponding compliant mechanism undergoes an elastic deformation.

Thanks to these features, the two flexible elements can be arranged with nearly no offset between them, in the direction of their widths, offering significant advantage over the state of the art by providing a construction with no or very low axial centre shift phenomenon, in the direction of their widths.

Furthermore, by arranging at least partly the flexible elements within a same width range, the overall dimensions of the device can be reduced with respect to those of known devices. Furthermore, when a latticework strategy is implemented, the stiffness of the blades, and therefore the rotational stiffness of the pivot can be reduced.

According to a preferred embodiment, the device further comprises
  a first part designed so as to be made as one with the first end of the first monolithic flexible element as well as with the first end of the second monolithic flexible element, and
  a second part designed so as to be made as one with the second end of the first monolithic flexible element as well as with the second end of the second monolithic flexible element,
  the device being arranged such that the first and second parts are able to be subjected to a relative movement of rotation.

These features allow the easy manufacture of a pivot device or bearing with excellent mechanical properties by additive manufacturing and thus without any necessity to proceed with assembling operations to complete the compliant mechanism. There is a further advantage in that pivots with several sizes, and/or several different stiffness or other characteristics can be modified very easily and quickly (only based on different 3D CAD models) and built within the same AM batch. Indeed, there is no necessity of providing different hemi-cylindrical parts, or production apparatuses which are different for each size of the C-FLEX pivot.

Advantageously, in this case, the first and second parts may be first and second hemi-cylindrical parts facing each other, while defining a first gap between them, and each of which bears a cylindrical sleeve along part of its length, the cylindrical sleeves being arranged with respect to each other so as to define a second gap between them such that the first and second parts are able to rotate with no contact or friction between them.

Generally, it might be preferable to provide that each of the first and second monolithic flexible elements is a substantially planar latticework blade.

According to an alternate preferred embodiment, the first monolithic flexible element presents an axial symmetry and is arranged so as to connect a first mass to a second mass such that the first and second masses are able to rotate with respect to each other around a first rotation axis located on the axis of symmetry of the first monolithic flexible element. Moreover, the second monolithic flexible element presents an axial symmetry and is arranged so as to connect the second mass to a third mass such that the second and third masses are able to rotate with respect to each other around a second rotation axis located on the axis of symmetry of the second monolithic flexible element, the first and second monolithic flexible elements being interlocked latticework members such that the first and second rotation axis are perpendicular to each other so as to define a gimbals type link between the first and third masses.

According to another alternate preferred embodiment, the device further comprises a third monolithic flexible element, having first and second ends defining a third longitudinal direction, arranged such that it is able to be subjected to an elastic deformation involving a relative movement between its first and second ends, the first, second and third monolithic flexible elements being three interlocked latticework blades each of which has a first end connected to a first mass and a second end connected to a second mass and being arranged so as to define a rotation axis perpendicular to the two other rotation axis defined by the two other blades, such that the first and second masses are able to pivot with respect to each other around three perpendicular rotation axis.

Generally, it is possible to further provide that each of the monolithic flexible elements comprises two or more openings located between its first and second ends and defining a passage for a portion of any other of the monolithic flexible elements.

The invention also relates to a method for manufacturing a device comprising a compliant mechanism comprising
- a first monolithic flexible element, having first and second ends defining a first longitudinal direction, arranged such that it is able to be subjected to an elastic deformation involving a relative movement between its first and second ends, and
- at least a second monolithic flexible element, having first and second ends defining a second longitudinal direction distinct from the first longitudinal direction, arranged such that it is able to be subjected to an elastic deformation involving a relative movement between its first and second ends, the method comprising a step consisting in implementing an additive manufacturing process, so as to build the first and second monolithic flexible elements and, such that the first and second monolithic flexible elements are interlocked.

According to a preferred embodiment, the method of the invention further comprises a step consisting in providing a design of a geometrical shape to be manufactured, for each of the first and second monolithic flexible elements, the design being conceived to fulfil a predefined mechanical function involving the elastic deformation of the corresponding monolithic flexible element, at least one of the designs comprising at least one opening located between the first and second ends of the corresponding monolithic flexible element and defining a passage for a portion of the other monolithic flexible elements.

In this case, the design, for each of the first and second monolithic flexible elements, preferably takes into account the maximal amplitudes of the elastic deformation the first and second monolithic flexible elements might be subjected to before they enter into contact with each other.

Generally, the method may further comprise the steps consisting in
- applying a set of overhang rules at least on the opening in order to check whether its manufacture by implementation of the additive manufacturing process would require the manufacture of a support structure;
- providing data relating to the corresponding support structure, —computing an amended design by combining the corresponding design with the support structure data, in such a way that the amended design integrates a non-sacrificial support structure as a part of the corresponding monolithic flexible element.

Still on a general basis, the method may further comprise the manufacture of:
- a first part designed so as to be made as one with the first end of the first monolithic flexible element as well as with the first end of the second monolithic flexible element, and
- a second part designed so as to be made as one with the second end of the first monolithic flexible element as well as with the second end of the second monolithic flexible element,
- the first and second parts being able to be subjected to a relative movement of rotation.

In this case, the first and second parts may be first and second hemi-cylindrical parts facing each other, while defining a first gap between them, and each of which bears a cylindrical sleeve along part of its length, the cylindrical sleeves being arranged with respect to each other so as to define a second gap between them such that the first and second parts are able to rotate with no contact or friction between them.

On a general basis, the additive manufacturing process might be taken from the group comprising Selective Laser Melting, Selective Laser Sintering, Fused Deposition Melting, Electron Beam Melting, Direct Energy Deposition, Binder Jetting and Photopolymerization.

Typically, the device is manufactured on a building plate by implementation of the additive manufacturing process. Thanks to a suitable amended design, it might preferably be removed from the building plate by a cutting operation that takes place within one to three distinct planes, more preferably within one single plane. Thus, the manufacturing process can be even more simplified in comparison to known processes.

BRIEF DESCRIPTION OF THE DRAWINGS

Further details of the invention will appear more clearly upon reading the description below, in connection with the following figures which illustrate.

EMBODIMENTS OF THE INVENTION

The present invention relates to the manufacture of mechanical devices, through an additive manufacturing process, which comprise a mechanical compliant mechanism comprising at least first and second flexible elements which are arranged with respect to each other so as to be interlocked, offering significant advantage over the state of the art, as explained earlier.

Figure 2:
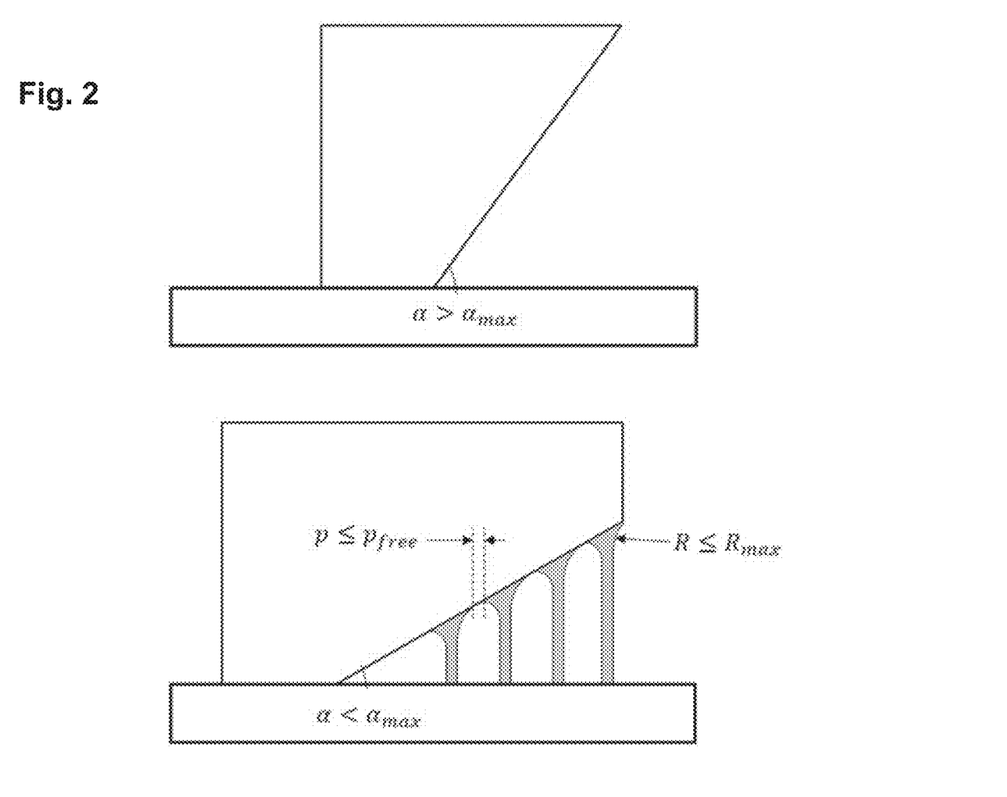
FIGS. 2 and 3: schematic illustrations explaining which rules need to be fulfilled during additive manufacturing processes.

As far as the additive manufacturing process is concerned, some empirical rules have to be followed when designing a device, which can be gathered in a set of overhang rules, the process being generally taken from the group comprising Selective Laser Melting, Selective Laser Sintering, Fused Deposition Melting, Electron Beam Melting, Direct Energy Deposition, Binder Jetting and Photopolymerization. A simple non-exhaustive example of such overhang rules is schematically illustrated in FIG. 2:

1) A structure tilted by less than a critical angle ($\alpha_{max}$) with respect to the horizontal direction does require support,
2) A radius bigger than a critical value ($R_{max}$) does require support, and
3) A free standing structure extending on an overhang plane along a horizontally projected length p longer than a critical value ($p_{free}$) does require support.

For SLM, typical critical values of $\alpha_{max}$ can vary from 19° to 45° approximately, $R_{max}$ is approximately 3 mm, $p_{free}$ is approximately 0.5 mm.

In the fabrication of a flexure blade through an additive manufacturing process, it is important to consider the orientation of the blade during the fabrication in regard to the overhang limitations.

Figure 3:
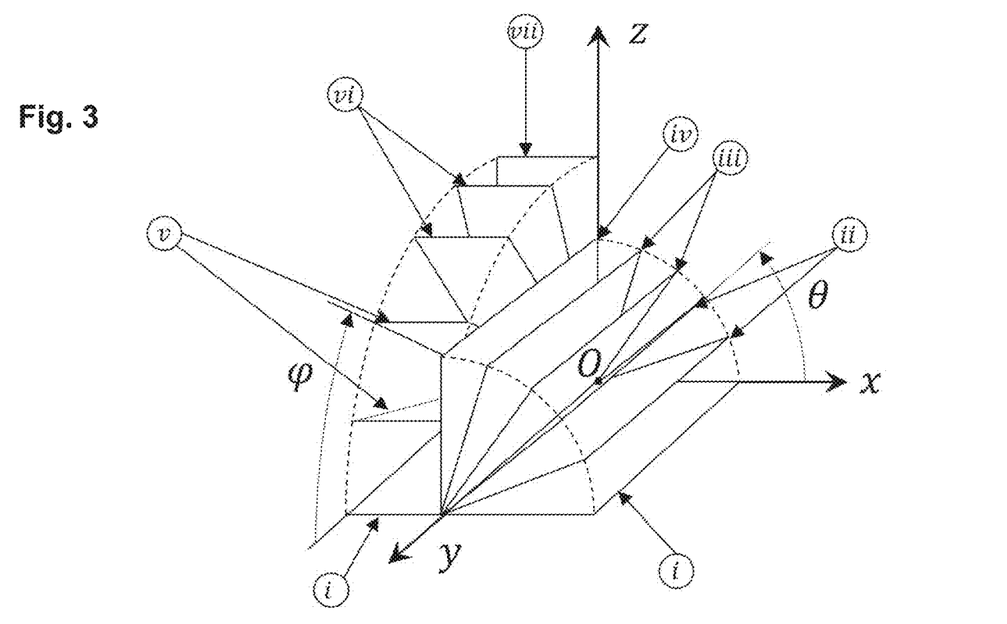

FIG. 3 schematically illustrates different families of blades classified according to their spatial orientation. In the figure, the Z axis represents the building direction of the additive manufacturing process. One can distinguish seven types of blades:

i) A horizontal blade,
ii) A horizontal blade tilted by an angle $\theta<\alpha_{max}$ around its length side (y-axis),
iii) A horizontal blade tilted by an angle $\theta\geq\alpha_{max}$ around its length side (y-axis),
iv) A sagittal blade (i.e. a blade with its length side being horizontal and its width side being vertical),
v) A horizontal blade tilted by an angle $\varphi<\alpha_{max}$ around its width side (x-axis),
vi) A horizontal blade tilted by an angle $\varphi\geq\alpha_{max}$ around its width side (x-axis), and
vii) A vertical blade.

Some kinds of blades with particular orientations can be printed without support and some cannot. Based on the previously stated overhang rules, blades of types iii), iv), vi) and vii) don't need support while blades of types i) ii) and v) do need a support structure.

The need for support might be a disadvantage compared to cases where no support structure is required. Indeed, the support removal process is time consuming, risky for slender parts like the flexible blades and limit the design freedom by requiring external access for the support structure removal. In addition, the overall cost of the manufactured device is therefore raised accordingly with the additional material and the post-processing time used for the support structure removal.

The aforementioned set of overhang rules and corresponding designing principle involve different design strategies applicable to the manufacture of blades or flexural element orientations. These strategies include latticework, interlocking, piling, bypassing and combining (of these strategies).

Latticework consists in creating openings to virtually decrease the natural stiffness of a blade and is well suited for sagittal blades.

Interlocking is used when two structures cross each other while being interpenetrated. An opening in a support structure also allows interlocking of intersecting sagittal blades.

Piling consists in supporting a horizontal blade with a tree-like structure that minimizes the impact on the bending stiffness.

Bypassing is used when several flexure elements are one above the other and are not connected to each other, which is typically supported by latticework or piling.

Combining is any combination of latticework, interlocking, piling and bypassing.

Latticework strategy only will be detailed hereafter as far as it is narrowly linked to the implementation of the present invention. Indeed, it should be noticed here that the implementation of latticework provides the following advantages: —possibility to carry out an interlocking of crossed blades for monolithic compliant mechanisms on two intersecting planar surfaces;

centre shift of interlocked crossed blades pivot is enhanced compared to non-interlocked crossed blades pivot, and the natural stiffness of such latticework blades is equivalent to the natural stiffness of a narrower full blade but its transverse stiffness is increased compared to such a narrower full blade.

FIGS. 4a to 4h are schematic views illustrating logical steps for conceiving a design of a sagittal blade according to the invention, prior to the implementation of an additive manufacturing process.

Figure 4A:
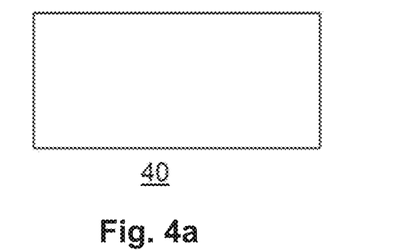
FIGS. 4a-4h: schematic views illustrating logical steps for conceiving a design of a first examplary compliant device, prior to the implementation of an additive manufacturing process, according to the invention.
Figure 4B:
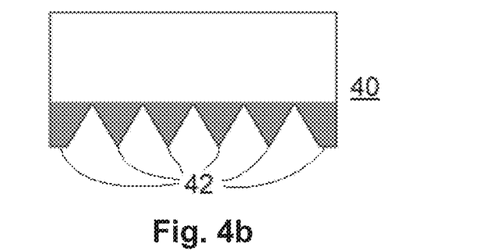
Figure 4C:
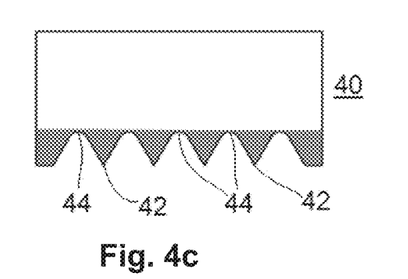
Figure 4D:
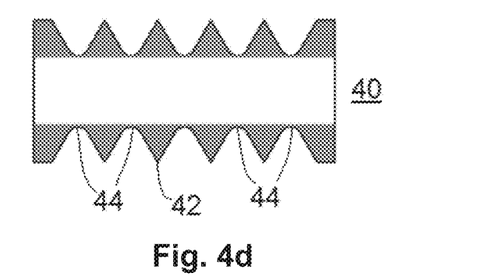

Starting from a blank sagittal blade 40 on FIG. 4a, triangles are cut out in order to reduce the support structure attachment area 42, as illustrated on FIG. 4b. Radii 44 might then be added for stiffness and stress reasons, as shown in FIG. 4c. The same operations are preferably carried out on the opposite side of the sagittal blade 40 for keeping it symmetrical, as illustrated on FIG. 4d.

Figure 4E:
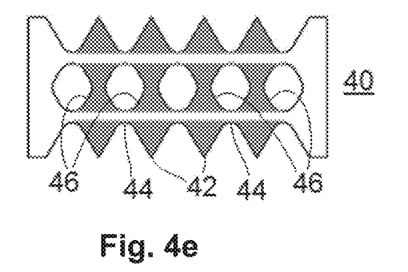
Figure 4F:
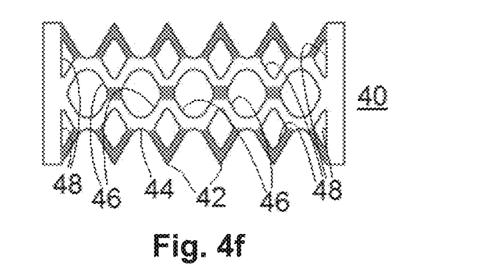

Further, large openings 46 are cut out in the sagittal blade 40 in order to make the crossing of two blades possible, as shown in FIG. 4e, while secondary openings 48 can be made, in order to keep the section of the blade 40 more or less constant and avoid a polygonal effect, as illustrated in FIG. 4f.

Figure 4G:
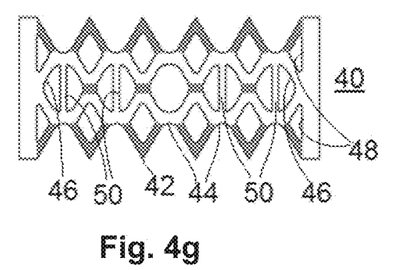

Advantageously, main stiffeners 50 defining a vertical compressive structure can be added, at least in some of the large openings 46, in order to increase the longitudinal stiffness, without increasing the stiffness in flexion, as illustrated in FIG. 4g. Secondary stiffeners 52 might be added in the secondary openings 48 in order to further increase the longitudinal stiffness of the blade 40, as shown in FIG. 4h.

Figure 4H:
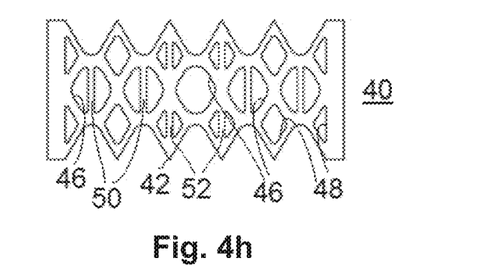

A sagittal blade 40 exhibiting the design as illustrated in FIG. 4h can then be manufactured through one of the previously mentioned additive manufacturing method without any need to provide a sacrificial support structure, hence simplifying the whole manufacturing process with respect to prior art processes.

Such a blade can be used as a compliant mechanism, while having a first end connected to a support and the other end connected to a part intended to move in flexion around the support.

Figure 5:
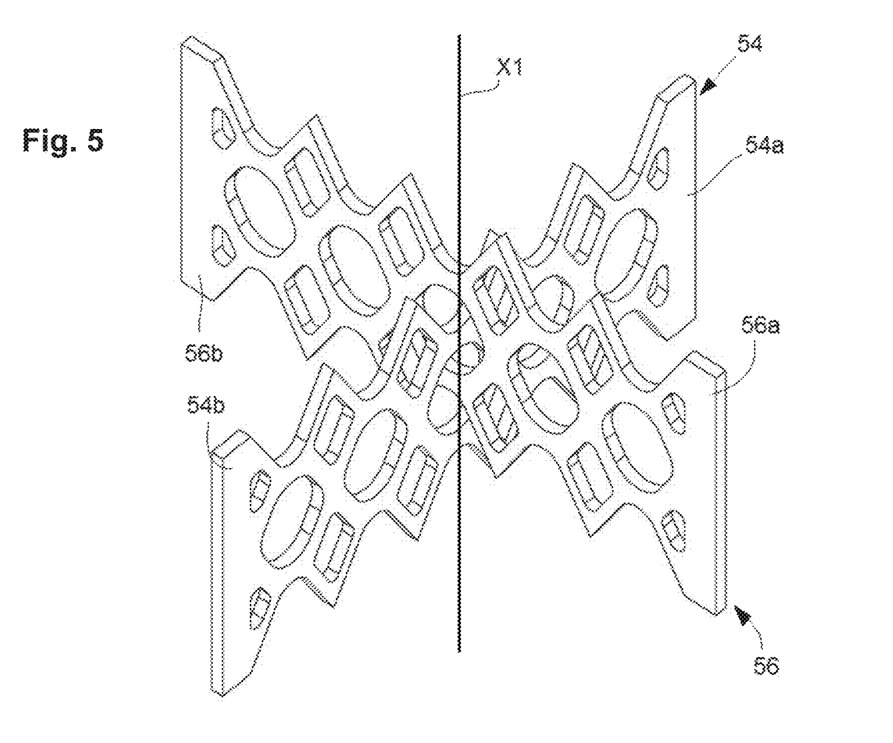
FIG. 5: a schematic perspective view of a second examplary compliant device according to the invention and partly based on the design of FIG. 4f.

Two latticework blades of this type can be manufactured in an interlocking fashion as illustrated in FIG. 5.

Indeed, the two blades 54 and 56 result from the above described design strategy and are interlocked in such a way that each of them can exhibit a flexion around a rotation axis X1 up to an angle of approximately +/−20 degrees without entering in contact with the other blade.

Such a construction enhances the centre shift performance of the pivot as well as the out-of-plane stiffness, while the post-processing is greatly simplified with respect to prior art processes.

Each of the blades 54, 56 may have one of its ends 54a, 56a connected to a first mass (non-illustrated), for instance a still support, while the two free ends 54b, 56b are connected to a second mass such that the first and second masses are able to pivot with respect to each other around the rotation axis X1.

Figure 6:
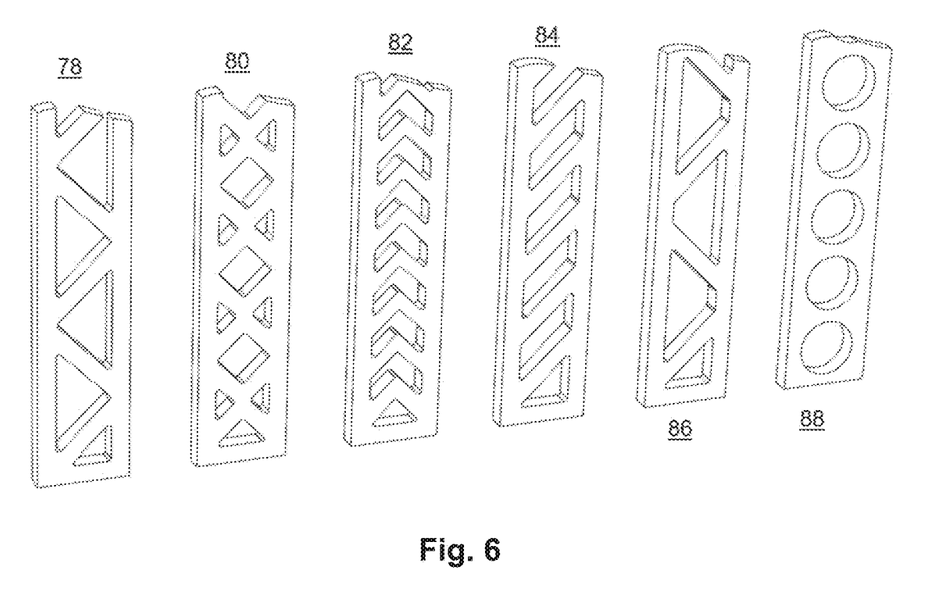
FIG. 6: simplified partial perspective views of different alternate embodiments of a compliant device partly based on the design building process as shown on FIGS. 4a-4h.

FIG. 6 illustrates simplified partial perspective views of different alternate embodiments of a compliant device partly based on the design building process as described in connection with FIGS. 4a to 4h.

Vertical blades 78, 80, 82, 84, 86 and 88 illustrate a variety of possible openings or lattice shapes that can be implemented as described above and all of which fulfil the requirements as stated by the set of overhang rules.

It is noticeable that the design of blade 88 is limited by the dimensions of its holes which might not be bigger than 6 mm in diameter, otherwise the overhang would be too great.

Figure 7A:
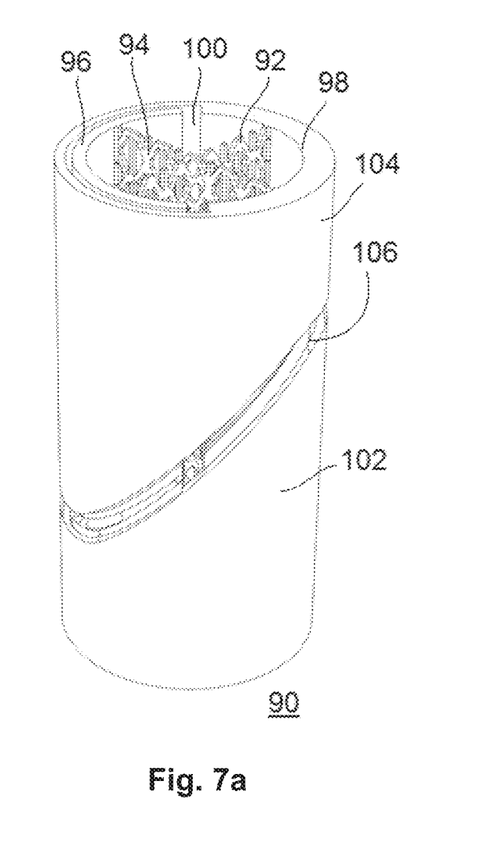
FIGS. 7a-7b: schematic perspective views of a third examplary compliant device according to the invention.
Figure 7B:
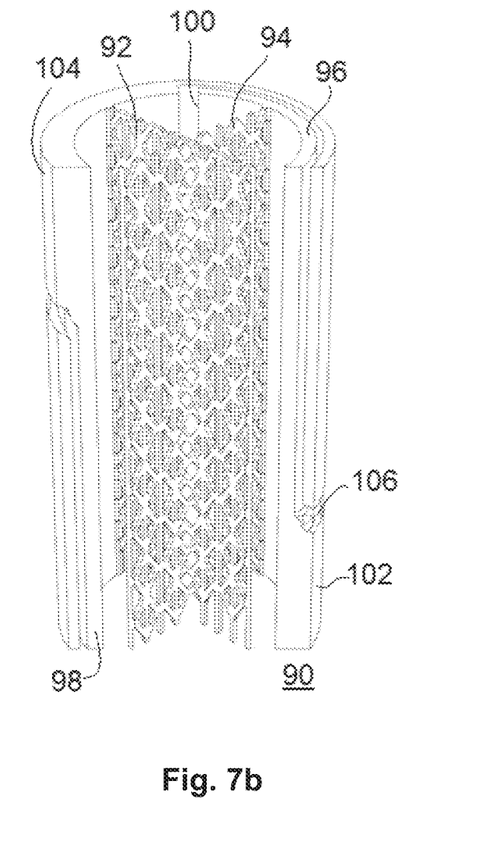

FIGS. 7a and 7b illustrate a further examplary embodiment of a mechanical device 90, here a compliant mechanism, based on the principle of interlocking latticework blades as previously described in connection with the embodiment of FIG. 5.

Indeed, the mechanical device 90 comprises two interlocked latticework blades 92 and 94 each of which has a first end connected to a first mass 96 and a second end connected to a second mass 98, such that these first and second masses are able to pivot with respect to each other around a rotation axis located at the intersection of the blades 92, 94.

According to the more specific embodiment of FIGS. 7a and 7b, the first and second masses 96, 98 are first and second hemi-cylindrical masses facing each other, while defining a first gap 100 between them, and each of which bears a cylindrical sleeve 102, 104 along part of its length, the cylindrical sleeves 102, 104 being arranged with respect to each other so as to define a second gap 106 between them such that the first and second masses 96, 98 are able to rotate with no friction between them. The second gap 106 is located between two planes which are tilted with respect to the axis of the relative rotation between the first and second masses 96, 98.

It appears thus that, thanks to the invention, a pivot bearing similar to the known C-Flex bearing mentioned above can be manufactured according to a far simpler manufacturing process than the known process.

Figure 8A:
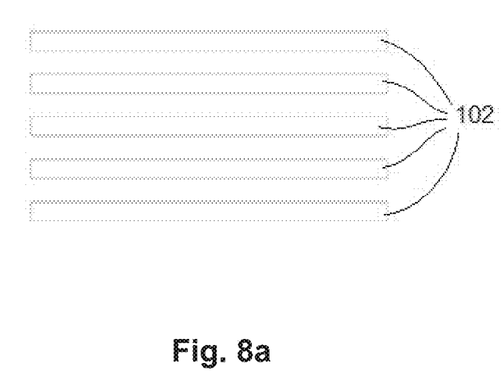
FIGS. 8a and 8b: schematic views illustrating logical steps for conceiving a design of a fourth examplary compliant device, prior to the implementation of an additive manufacturing process, according to the invention.
Figure 8B:
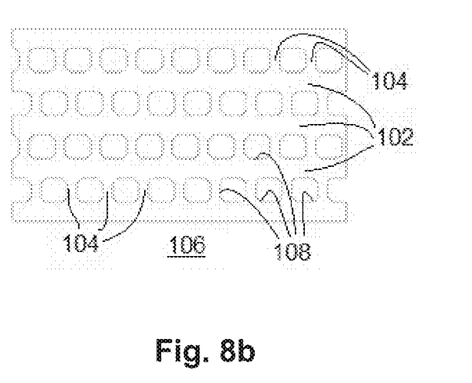
Figure 9:
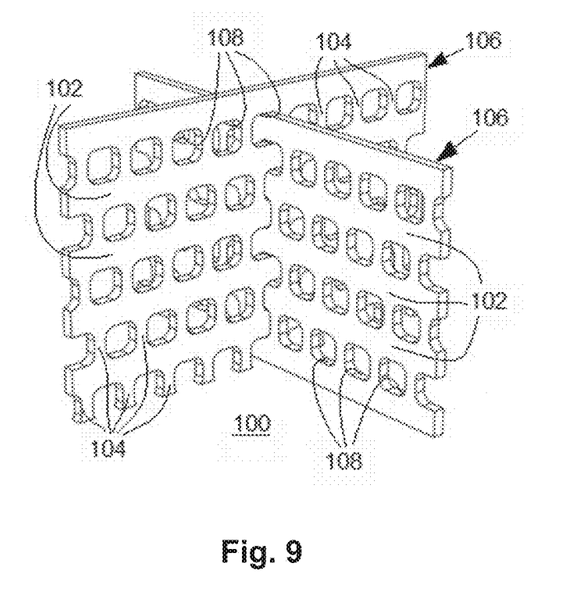
FIG. 9: a schematic perspective view of the fourth examplary compliant device according to the invention and based on the design of FIG. 8b.

FIGS. 8a, 8b and 9 illustrate a further examplary embodiment of a compliant mechanism 100 (FIG. 9) based on the principle of interlocking latticework blades as previously described in connection with the embodiments of FIGS. 4a-4h and 5.

FIG. 8a illustrates a design of a geometrical shape to be manufactured, for each of a first and a second monolithic flexible elements, this design being conceived to fulfil a predefined mechanical function involving the elastic deformation of the corresponding monolithic flexible element. This design, comprising parallel thin blades 102, allows two corresponding flexible elements to be arranged so as to cross each other, by offsetting the blades 102 from a flexible element with respect to the blades 102 of the other flexible element.

However, the additive manufacturing process for these blades 102 requires the provision of a support structure (see the set of overhang rules as mentioned above).

According to an advantageous embodiment of the present invention, non-sacrificial pillars 104 can be designed and manufactured to connect the blades 102 to each other such that the complete assembly finally fulfils the set of overhang rules and that, at the same time, each corresponding monolithic flexible element 106 (FIG. 8b) comprises openings 108 allowing two such flexible elements 106 to be arranged across each other, as illustrated in FIG. 9.

It appears from a comparison of the compliant mechanisms illustrated in FIG. 5 and in FIG. 9 that the one skilled in the art might be able to conceive an unlimited number of embodiments allowing the manufacture of at least two flexible elements arranged across one another, thanks to the fact that at least one of them comprises an adequate opening.

Figure 10A:
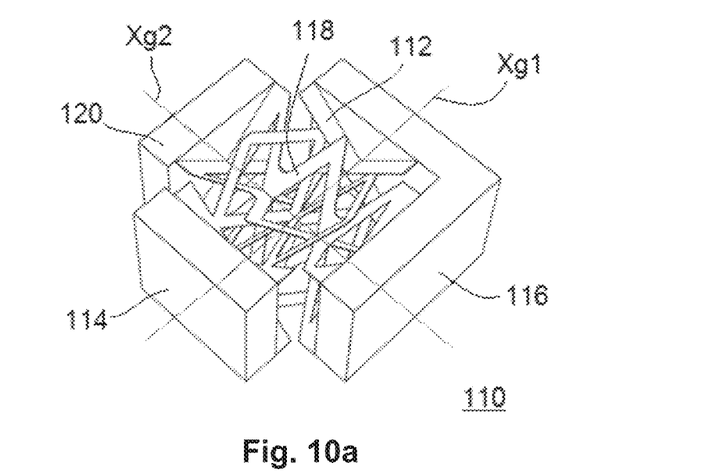
FIGS. 10a-10b: schematic perspective views of a fifth examplary compliant device according to the invention.
Figure 10B:
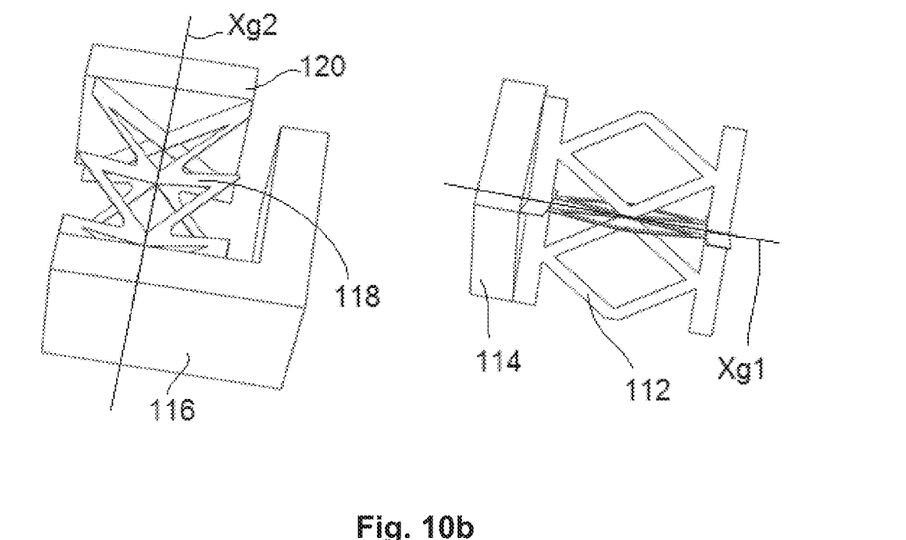

FIGS. 10a and 10b illustrate a further examplary embodiment of a compliant mechanism 110 based on the principle of interlocking latticework blades as previously described in connection with the embodiment of FIG. 5.

The compliant mechanism comprises here a first axially symmetrical elastic member 112 connecting a first mass 114 to a second mass 116 such that the first and second masses 114 and 116 are able to rotate with respect to each other around a first rotation axis Xg1 located on the axis of symmetry of the first elastic member 112.

The mechanical device 110 further comprises a second axially symmetrical elastic member 118 connecting the second mass 116 to a third mass 120 such that the second and third masses 116, 120 are able to rotate with respect to each other around a second rotation axis Xg2 located on the axis of symmetry of the second elastic member 118.

The first and second elastic members 112, 118 are interlocked latticework members such that the first and second rotation axis Xg1 and Xg2 are perpendicular to each other so as to define a gimbals type link between the first and third masses 114, 120, thanks to the monolithic mechanical device 110.

The elastic members 112 and 118 are illustrated separately in FIG. 10b so that their structure can be better appreciated.

Figure 11A:
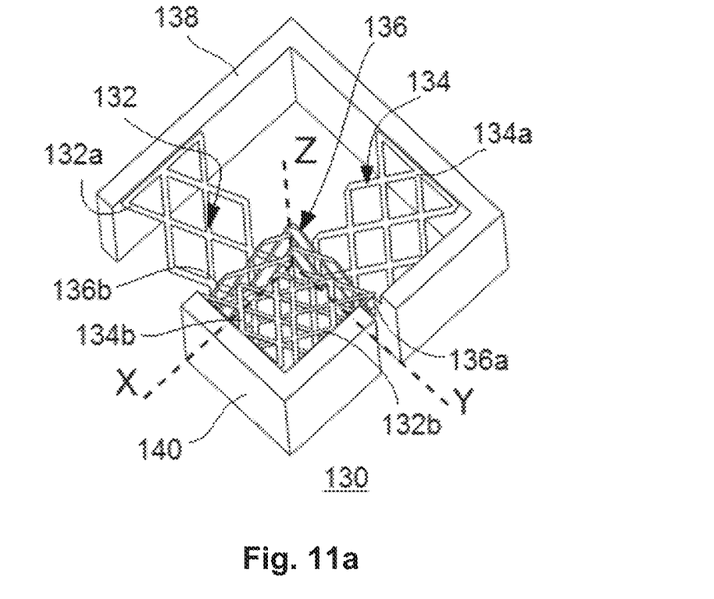
FIGS. 11a-11b: schematic perspective views of a sixth examplary compliant device according to the invention.
Figure 11B:
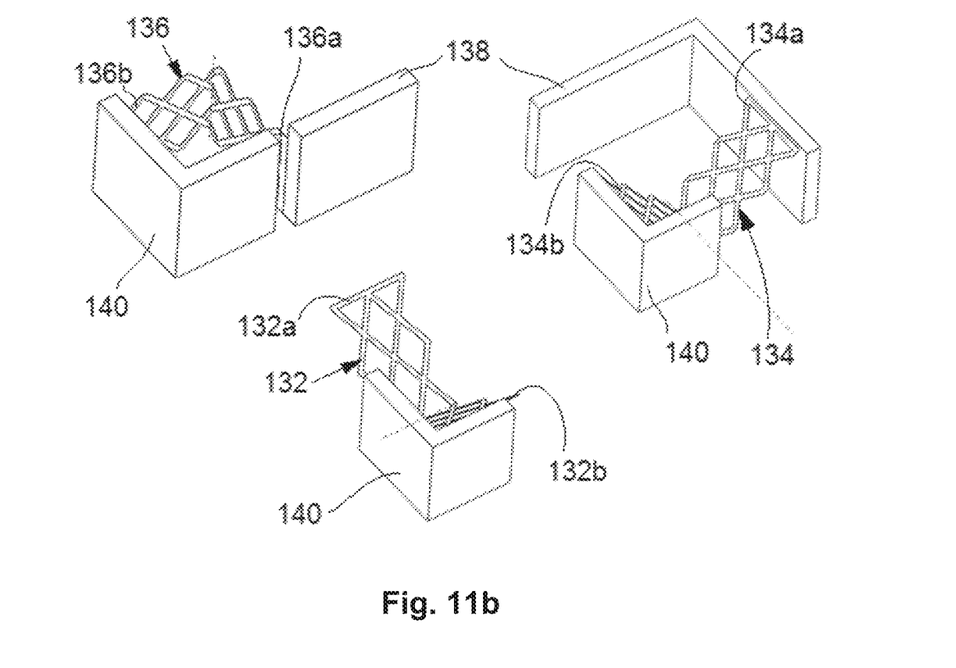

FIGS. 11a and 11b illustrate a further examplary embodiment of a compliant mechanism 130 based on the principle of interlocking latticework blades as previously described in connection with the embodiment of FIG. 5.

According to this further alternate preferred embodiment, the mechanical device 130 is a compliant device comprising three interlocked latticework blades 132, 134, 136 each of which has a first end 132a, 134a, 136a connected to a first mass 138 and a second end 132b, 134b, 136b connected to a second mass 140.

Each blade is arranged so as to define a rotation axis perpendicular to the two other rotation axis defined by the two other blades, such that the first and second masses 138, 140 are able to pivot with respect to each other around three perpendicular rotation axis X, Y and Z.

Again, the blades 132, 134, 136 are illustrated separately in FIG. 11b so that their structures can be better appreciated.

We note here, in the light of the embodiment illustrated in FIGS. 11a and 11b, that, according to the present disclosure, a longitudinal direction of the flexible element can be defined between its two ends though it is not necessary rectilinear.

Figure 12A:
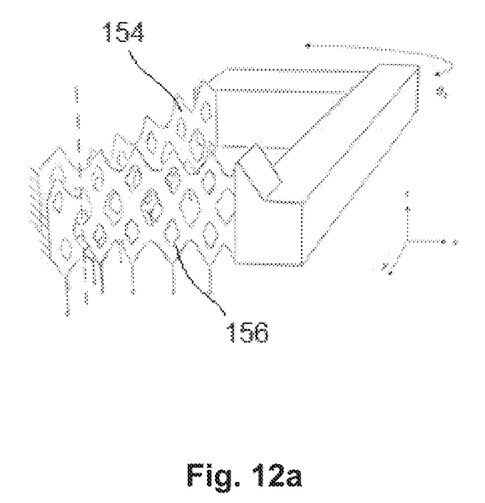
FIGS. 12a-12b: schematic perspective views of further examplary embodiments of compliant devices according to the invention.
Figure 12B:
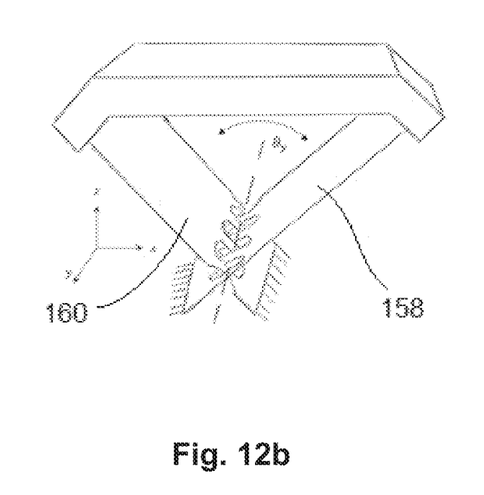

FIGS. 12a and 12b illustrate simplified perspective views of further examplary embodiments of compliant devices according to the invention.

In these figures, two different configurations are shown in which perpendicular blades define rotation pivots. The flexure blades in these examples are crossing at position described by W. H. Wittrick (W. H. Wittrick, *The Theory of Symmetrical Crossed Flexure Pivots*, Department of Aeronautical Engineering, University of Sydney, Australia, 1948), minimizing their centre shifts.

In these illustrated cases, the whole device can be released by cutting only along one plane which is horizontal and at the lower position along the z-axis. It is noticeable that the support structure(s) for the mobile rigid portions of these devices are not represented and that the fixed rigid portions are not shown for clarity reason. The latter are only represented by a fixation cross-hatch marking.

These two examples illustrate:
- on FIG. 12a: a Wittrick pivot comprising two sagittal blades 154, 156, and
- on FIG. 12b: a Wittrick pivot comprising two vertical tilted blades 158, 160.

As already stated above, it is possible to provide integration of a non-sacrificial support structure in the design of a device comprising a compliant mechanism to be manufactured through application of the set of overhang rules instead of designing a sacrificial support structure like is usually done. Thus, the typical step of removal of the sacrificial support structure might preferably be avoided.

Preferably, different specific design strategies can be carried out in the designing step leading from an original projected design based on predefined requirements to an amended design incorporating at least one opening in at least one of the flexible elements that the device comprises.

The present invention provides a simple manufacturing method for obtaining a device comprising a compliant mechanism exhibiting excellent mechanical properties. The monolithic flexible elements comprised by the compliant mechanism can be either similar to each other, or even identical, such that the compliant mechanism might exhibit some kind of symmetry, or they can be totally different from each other, the compliant mechanism exhibiting no particular symmetry, without going beyond the scope of the present invention.

Although the invention has been described in terms of particular embodiments, various modifications are possible without departing from the scope of the invention as defined in the appended claims.

What is claimed is:

1. A device comprising a compliant mechanism, comprising:
   a first monolithic flexible element, having first and second ends defining a first longitudinal direction, adapted to undergo an elastic deformation involving a relative movement between said first and second ends; and
   at least a second monolithic flexible element, having first and second ends defining a second longitudinal direction distinct from said first longitudinal direction, adapted to undergo an elastic deformation involving a relative movement between said first and second ends,
   wherein each of said first and second monolithic flexible elements comprises at least one opening, located between its first and second ends and defining a passage for a portion of the other of said first and second monolithic flexible elements, such that said first and second monolithic flexible elements are interlocked.

2. The device of claim 1, further comprising:
   a first part configured to be made as one with said first end of said first monolithic flexible element as well as with said first end of said second monolithic flexible element; and
   a second part configured to be made as one with said second end of said first monolithic flexible element as well as with said second end of said second monolithic flexible element,
   said device being arranged such that said first and second parts are able to be subjected to a relative movement of rotation.

3. The device of claim 2, wherein said first and second parts are first and second hemi-cylindrical parts facing each other and having a first gap therebetween, and each of which bears a cylindrical sleeve along part of its length, the cylindrical sleeves being arranged with respect to each other so as to define a second gap therebetween such that said first and second hemi-cylindrical parts are able to rotate with no contact or friction between them.

4. The device of claim 1, wherein each of said first and second monolithic flexible elements is a substantially planar latticework blade.

5. The device of claim 2, wherein each of said first and second monolithic flexible elements is a substantially planar latticework blade.

6. The device of claim 1, wherein:
   said first monolithic flexible element presents an axial symmetry and is arranged so as to connect a first mass to a second mass such that said first and second masses are able to rotate with respect to each other around a first rotation axis located on the axis of symmetry of said first monolithic flexible element, and
   said second monolithic flexible element presents an axial symmetry and is arranged so as to connect said second mass to a third mass such that said second and third masses are able to rotate with respect to each other around a second rotation axis located on the axis of symmetry of said second monolithic flexible element,
   said first and second monolithic flexible elements being interlocked latticework members such that said first and second rotation axis are perpendicular to each other so as to define a gimbals type link between said first and third masses.

7. The device of claim 1, further comprising:
   a third monolithic flexible element, having first and second ends defining a third longitudinal direction, arranged such that it is able to be subjected to an elastic deformation involving a relative movement between said first and second ends,
   wherein said first, second and third monolithic flexible elements are three interlocked latticework blades, each of which has a first end connected to a first mass and a second end connected to a second mass and being arranged so as to define a rotation axis perpendicular to the two other rotation axis defined by the two other blades, such that said first and second masses are able to pivot with respect to each other around three perpendicular rotation axis.

8. The device of claim 1, wherein each of said monolithic flexible elements comprises two or more openings located between said first and second ends and defining a passage for a portion of any other of said monolithic flexible elements.

9. The device of claim 4, wherein each of said monolithic flexible elements comprises two or more openings located between said first and second ends and defining a passage for a portion of any other of said monolithic flexible elements.

10. A method for manufacturing a device comprising a compliant mechanism that comprises a first monolithic flexible element, having first and second ends defining a first longitudinal direction, adapted to undergo an elastic deformation involving a relative movement between said first and second ends, and at least a second monolithic flexible element, having first and second ends defining a second longitudinal direction distinct from said first longitudinal direction, adapted to undergo an elastic deformation involving a relative movement between said first and second ends, the method comprising:
    a step of implementing an additive manufacturing process so as to build said first and second monolithic flexible elements such that each of them comprises at least one opening located between its first and second ends and defining a passage for a portion of the other of said first and second monolithic flexible elements and, such that said first and second monolithic flexible elements are interlocked, a portion of each of them extending through said opening of the other of said first and second monolithic flexible elements.

11. The method of claim 10, further comprising:

providing a design of a geometrical shape to be manufactured, for each of said first and second monolithic flexible elements, said design being conceived to fulfil a predefined mechanical function involving the elastic deformation of the corresponding monolithic flexible element, and wherein at least one of said designs comprises at least one opening located between said first and second ends of said corresponding monolithic flexible element and defining a passage for a portion of the other of said first and second monolithic flexible elements.

12. The method of claim 11, wherein said design, for each of said first and second monolithic flexible elements, takes into account the maximal amplitudes of said elastic deformation the first and second monolithic flexible elements might be subjected to before they enter into contact with each other.

13. The method of claim 11, further comprising:

applying a set of overhang rules at least on said opening in order to check whether the manufacture of said opening by implementation of said additive manufacturing process would require the manufacture of a support structure;

providing data relating to the corresponding support structure; and computing an amended design by combining said corresponding design with said support structure data, in such a way that said amended design integrates a non-sacrificial support structure as a part of the corresponding monolithic flexible element.

14. The method of claim 12, further comprising:

applying a set of overhang rules at least on said opening in order to check whether the manufacture of said opening by implementation of said additive manufacturing process would require the manufacture of a support structure;

providing data relating to the corresponding support structure; and computing an amended design by combining said corresponding design with said support structure data, in such a way that said amended design integrates a non-sacrificial support structure as a part of the corresponding monolithic flexible element.

15. The method of claim 10, further comprising the manufacture of:
 a first part designed so as to be made as one with said first end of said first monolithic flexible element as well as with said first end of said second monolithic flexible element; and
 a second part designed so as to be made as one with said second end of said first monolithic flexible element as well as with said second end of said second monolithic flexible element,
 said first and second parts being able to be subjected to a relative movement of rotation.

16. The method of claim 11, further comprising the manufacture of:
 a first part designed so as to be made as one with said first end of said first monolithic flexible element as well as with said first end of said second monolithic flexible element; and
 a second part designed so as to be made as one with said second end of said first monolithic flexible element as well as with said second end of said second monolithic flexible element,
 said first and second parts being able to be subjected to a relative movement of rotation.

17. The method of claim 13, further comprising the manufacture of:
 a first part designed so as to be made as one with said first end of said first monolithic flexible element as well as with said first end of said second monolithic flexible element; and
 a second part designed so as to be made as one with said second end of said first monolithic flexible element as well as with said second end of said second monolithic flexible element,
 said first and second parts being able to be subjected to a relative movement of rotation.

18. The method of claim 15, wherein said first and second parts are first and second hemi-cylindrical parts facing each other, while defining a first gap between them, and each of which bears a cylindrical sleeve along part of its length, the cylindrical sleeves being arranged with respect to each other so as to define a second gap between them such that said first and second parts are able to rotate with no contact or friction between them.

19. The method of claim 10, wherein said additive manufacturing process is selected from the group consisting of Selective Laser Melting, Selective Laser Sintering, Fused Deposition Melting, Electron Beam Melting, Direct Energy Deposition, Binder Jetting, and Photopolymerization.

20. The method of claim 10, said device being manufactured on a building plate by implementation of said additive manufacturing process, wherein said device is removed from said building plate by a cutting operation that takes place within one to three distinct planes, preferably within one single plane.

* * * * *